United States Patent [19]

Kryscyk

[11] Patent Number: 4,715,770
[45] Date of Patent: Dec. 29, 1987

[54] POWER LIFT FOR A LIFTING DEVICE

[75] Inventor: Robert Kryscyk, Ketsch, Fed. Rep. of Germany

[73] Assignee: Deere & Company, Moline, Ill.

[21] Appl. No.: 13,214

[22] Filed: Feb. 5, 1987

Related U.S. Application Data

[63] Continuation of Ser. No. 786,924, Oct. 11, 1985, abandoned.

[30] Foreign Application Priority Data

Oct. 25, 1984 [DE] Fed. Rep. of Germany ....... 3439048

[51] Int. Cl.⁴ .............................................. B66C 1/00
[52] U.S. Cl. .................................... 414/680; 112/443; 112/448; 280/460 A; 414/920
[58] Field of Search ............... 414/703, 723, 722, 920, 414/680; 280/481, 460 A, 461 A, 456; 172/448, 442, 443, 817, 810

[56] References Cited

U.S. PATENT DOCUMENTS

| 3,031,208 | 4/1962 | Abbott | 280/460 A |
| 3,214,138 | 10/1965 | Jocher et al. | 280/481 X |
| 3,285,625 | 11/1966 | Krueger | 280/481 X |
| 3,441,091 | 4/1969 | Helling | 280/481 X |
| 4,424,870 | 1/1984 | Weiss | 280/461 A X |
| 4,519,623 | 5/1985 | Orthman | 280/481 X |
| 4,558,881 | 12/1985 | Manteufel | 280/460 A |

Primary Examiner—Robert J. Spar
Assistant Examiner—Donald W. Underwood

[57] ABSTRACT

A power lift system includes a lifting device with lower links. The lower links are connected to a frame of the tractor by arms of an upper link. The lower links may be either vertically pivotably or rigidly coupled to the arms. The arms may be either rigidly or vertically pivotably connected to the tractor frame. The height and the lifting range of the lower links is variable.

6 Claims, 3 Drawing Figures

POWER LIFT FOR A LIFTING DEVICE

This application is a continuation of application Ser. No. 786,924, filed Oct. 11, 1985, abandoned.

BACKGROUND OF THE INVENTION

This invention relates to a power lift for a lifting device and in particular, to a front-mounted power lift of an agricultural tractor.

German Patent No. DE 25 06 745 discloses a power lift which is intended for connecting machines, such as ground cultivation implements, to the front part of an agricultural tractor.

This power lift is limited in regard to how it adapts to different attachments. It requires a high lifting force when lifting a heavy load or a load whose center of gravity is further away from the loading device or the tractor. Thus, problems arise when lifting machines which are connected to the tractor by way of a universal-joint drive shaft, if the spacing between the points of connection of the drive shaft is too short and if the shaft should not or cannot be sufficiently shortened.

SUMMARY OF THE INVENTION

An object of the present invention is to develop a power lift that can be adapted to different mounting situations.

This and other objects are achieved according to the invention in that selectively, the lower link is vertically pivotable on the arm and the arm can be non-rotatably connected to the lifting device. In that way, the load can be pivoted either about a pivot axis between the lower link and the arm or about a pivot axis between the arm and the lifting device. As those two pivot axes are at different distances in front of the lifting device or, in front of the tractor, the lifting range of the power lift is also shifted. It can be displaced rearwardly and towards the lifting device so that a heavy load, such as a front-mounted plow, does not cause the tractor to be lifted on the side which is opposite to the power lift. This operation is independent of whether the load is lifted by force applied to the lower links or by force applied to an upper link, for the kinematic situation remains unaltered thereby. In addition, due to the shift in the lifting range of the arrangement, a small load can be held further away from the tractor in the lifting operation to provide space for a universally jointed shaft which may extend between the tractor and the load. In addition, due to the lifting range being shifted towards the lifting device, the overall length of the lifting device, with the load, can be reduced to comply with the very high standards which are prescribed by statutory provisions.

A reduction in the lifting force is also achieved because the lifting means engages the lower link. This feature affords the possibility of the point of application of force of the lifting means on the lower link with the arm being shifted further away from the pivot axis on the loading device so that the lever arm for lifting the load is increased and a lower force is required to produce the same moment. In that connection, it is completely immaterial whether the arm pivots on the lifting device or whether the lower link pivots on the arm.

Another proposal, according to the invention, provides that the arm can be non-rotatably connected to the lifting device in various angular positions. That proposal results in all the options in regard to the lifting range being classified into regions which are each associated with a respective angular position so that either by calculation or by experience, a person operating the loading device can select the optimum lifting range for each load or for each machine, in the case of an agricultural tractor. Thus, when there are three angular positions, the operator can clearly and simply distinguish a range which is far away from the loading device, a range which is towards the loading device, and a middle range.

Adjustment of the arm and the lower link is achieved by openings which correspond to the possible angular positions on a radius around the pivot axis of the lower link in the arm. The lower link, at the spacing of the radius from the pivot axis, also has an opening into which a holding element can be inserted for connection to the openings in the arm. Also, on a given radius around the pivot axis, the arm may have at least one opening and the lifting device has a plurality of openings which can be connected together in various angular positions by way of a holding means.

The shift in the lifting range reduces the lifting force if a plurality of pivot mounting points for the lifting means are provided on the lower link, with each point located at a respective different distance from the pivot axis of the link. In that case, the lever arm for lifting the load can be made of maximum length by virtue of the shift in the point of application of the power force of the lifting means on the lower link.

In order to prevent damage to a hydraulic cylinder type lifting means, due to the application of force from the outside and/or to mimimize the space required for the power lift, this invention further provides that the power lift is constructed on a frame comprising hollow shaped members which are enclosed or which are open at one side and which each accommodate therein a respective hydraulic cylinder.

In order to simplify the construction of the frame while providing various configurations of the power lift in order to be able to adapt it to various lifting devices, it is provided that mounted on the frame is at least one plate which has the openings of the lifting device and which accommodates an angle lever for transmitting the force from the hydraulic cylinder to the lower link. This affords the possibility of the lifting means being in the form of a pushing means whose movement is diverted into the desired direction by the angle lever so that, when using a hydraulic cylinder, the hydraulic cylinder can be actuated with pressure fluid at the piston side instead of at the piston rod side, in order thereby to produce a greater force. Because the direction of the lifting force can be changed so that the lifting means is not restricted to a specific direction of lifting movement, the lifting means can be mounted elsewhere on the power lift. More specifically, the lifting means can be mounted at the location where it gives the least trouble.

Another possible way of adapting the power lift to the prevailing circumstances results from the fact that the angle lever can be fixed in various positions relative to the plate.

Advantageously, torsional forces at the angle lever, at the plate, at the lower link and at the arm are avoided because the plate, the arm and the angle lever are each provided in duplicate, because a lift strut extends between the angle levers and the lower links and because the angle levers, the plates, the arms, the lower link and the lift strut are connected together in a telescopic assembly in such a way that the lift strut and the hydraulic cylinder are arranged between the two angle levers and the two angle levers and the two arms are arranged between the two plates. Thus, the angle lever is not pivoted to the plate at the side, but centrally between two plates so that no torsion loading occurs.

A problem with many power lifts is that the lower links project forwardly from the lifting device to a substantial extent when no load is being carried and, in the case of a motor vehicle, when travelling on public streets, must either be covered over or removed altogether. This problem is solved in that the lower links are pivotable about their pivot axis into a transportation position close to and parallel to, or subtantially parallel to, the front part of the lifting device, and can be fixed by means of the lift struts to the frame. This power lift is strong and stable because it is symmetrical about a longitudinal center plane of the tractor and, on each side of the longitudinal center plane, it has a lower link, a lifting means and an arm. A strutting means carries a mounting member for the upper link and rotatably receives a shaft which is connected to all angle levers.

The frame carries the entire power lift and can be selectively connected to the front part of the tractor and can be secured by means of holding pins so that relatively rapid and easy fitting of the power lift is achieved for transportation and operation. It is advantageous for the holding pins, at the same time, to serve for accommodating the lift struts when the lower links are in their transportation position.

DETAILED DESCRIPTION

Figure 1:
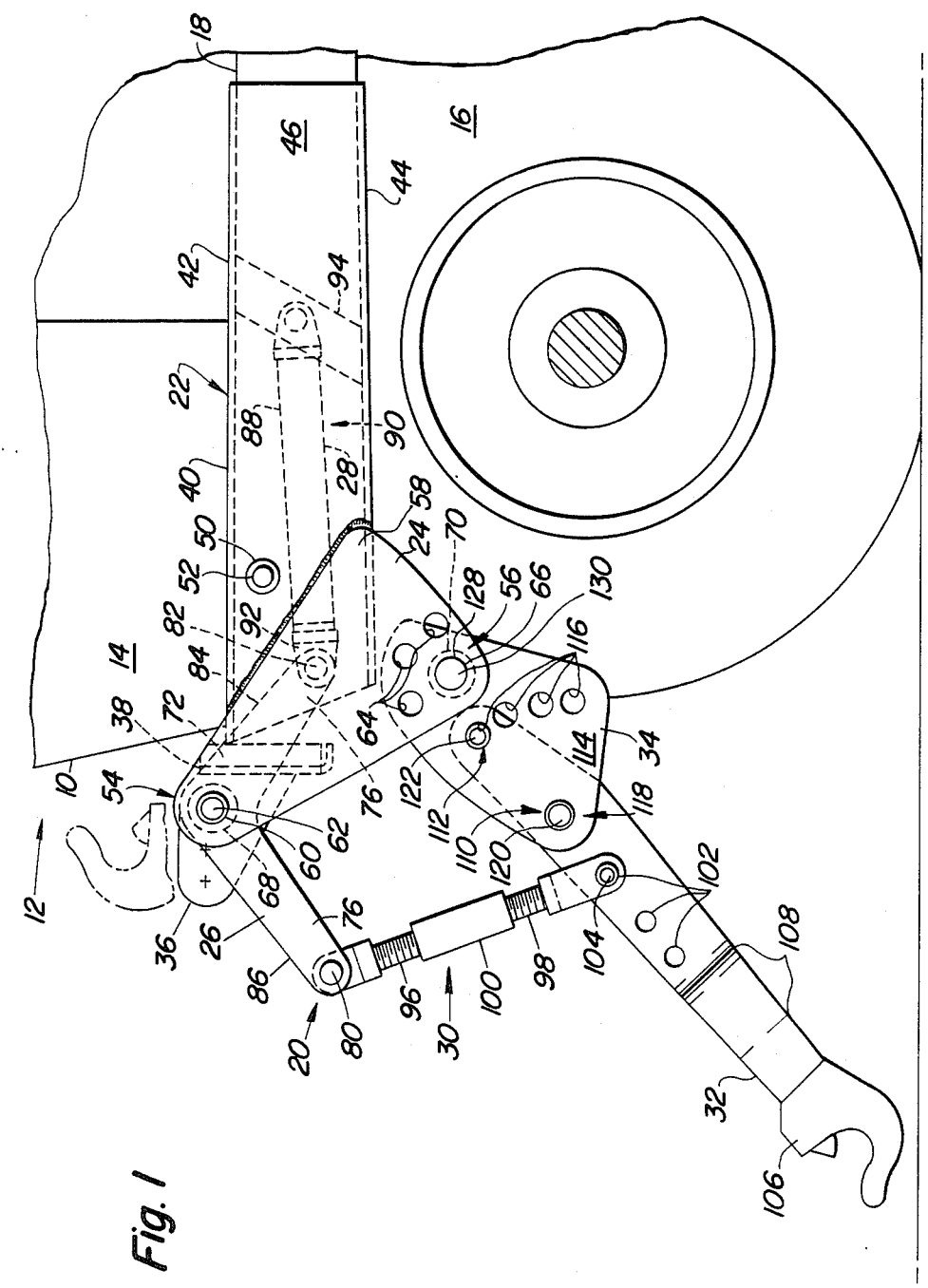
FIG. 1 shows a side view of a front part of an agricultural tractor with a power lift, according to the invention, in an operative position.

Referring to FIG. 1, a front part 10 of an agricultural tractor 12 includes an engine cover 14, a right-hand front wheel 16 and a main frame structure 18. References which are used hereinafter, such as left, right, front and rear, always relate to the direction of forward travel of the tractor 12. A power lift is constructed on the main frame structure 18, in the manner of a front-mounted power lift 20, which comprises a frame 22, a pair of plates 24, a lift arm 26 which is formed as an angle lever, a hydraulic cylinder 28 as the lifting means, a lift strut 30, a lower link 32, an arm 34 and, in the middle, a mounting member 36 for an upper link (seen only in FIG. 2). The front-mounted power lift 20 is symmetrical in construction with respect to the longitudinal center place of the tractor 12 so that a description of only the left side is sufficient.

When viewed from above, the frame 22 is of a U-shaped configuration and is substantially matched to the front part 10 of the tractor 12 in the region of its main frame structure 18. The frame 22 embraces the main frame structure 18 at the front and at the sides, more specifically with a transverse member 38 and two side plates 40. The side plates 40 are formed from a U-section steel member and the space 48 defined therewithin by upper and lower limbs 42 and 44 and a web portion 46 interconnecting the limbs 42 and 44 can partially accommodate therewithin the main frame structure 18. This enables the frame 22 to be pushed onto the main frame structure 18 and into an operative position from the front. In order to carry substantial bending moments, the U-section steel member may also be provided with a web portion 46 which increases in size in a forward direction. So that the frame 22 and the entire front power lift 20 can be secured and retained in the operative position, the web portion 46 and the main frame 18, on each side of the tractor 12, are provided with a bore (not shown). The two bores are aligned with each other when the frame 22 is in its operative position so that a holding pin 50 can be passed through the aligned bores for securing purposes. The holding pin 50 is fixed in position by suitable means (not shown), for example, a spring pin or a fold-type plug member. However, when in the inserted condition, the pin 50 still projects with a shank portion 52 outwardly beyond the respective web portion.

A triangular-shaped plate 24 is welded flat to the outside of the web 46. It is fixed to the web portion 46 in such a position that two corner regions come to lie in front of the frame 22, more specifically, an upper corner region 54 and a lower corner region 56. A third corner region 58 covers over a small part of the web portion 46. For the purposes of further description herein, the corner region 54, which is disposed forwardly and upwardly, is referred to as the upper corner region 54, while the corner region 56, which is disploseed forwardly and downwardly, is referred to as the lower corner region 56. Provided in the upper corner region 54 is a bore 60 for accommodating a shaft 62, the significance of which will be explained hereinafter. Provided in the lower corner region 56 are three openings or bores 64 and a bore which is formed as a mounting 66, with the three bores 64 being arranged in a quarter-circle array around the mounting 66 and each being of the same diameter which is smaller than the diameter of the mounting 66. In all, there are four identical plates 24 of which an outer plate is mounted to the outside of each of the left-hand and right-hand web portions 46, while a respective inner plate is mounted to each of the front portions of the frame 22. The inner plates 24, which are welded to the front portion of the frame 22, have an opening which corresponds to the area of the frame 22 which is covered over by the outer plate 24 so that they can be pushed onto and welded on the limb portions 42 and 44 of the frame 22. A forked bracket arrangement is formed on each side of the tractor 12 on the frame 22 with a space between the two mutually associated inner and outer plates 24. The bores 60, 64 and 66, which correspond to each other in the plates 24, are disposed on axes which extend normal to the longitudinal center plane of the tractor 12.

A pair of tubes 68 and 70 are provided as stiffening and strutting means for the front-mounted power lift 20 to resist lateral forces. The tubes 68 and 70 are disposed between the inner plates 24 concentrically with respect to the axis of the bores 60 in the upper corner regions 54 and concentrically with respect to the axis of the mountings 66 in the lower corner regions 56, respectively. Each tube 68, 70 is screwed or welded to the sides of the inner plates 24 which are towards the longitudinal center plane of the tractor 12. The transverse member 38 of the frame 22 also extends between the inner plates 24 and is either welded thereto or screwed thereto by way of angle members 72. That arrangement ensures that the internal spaces 48 defined by the frame 22 are open forwardly in the region between the respective inner and outer plates 24.

The space 48 which is formed between the plates 24 accommodates the lift arm 26 and accommodates the arm 34.

Figure 2:
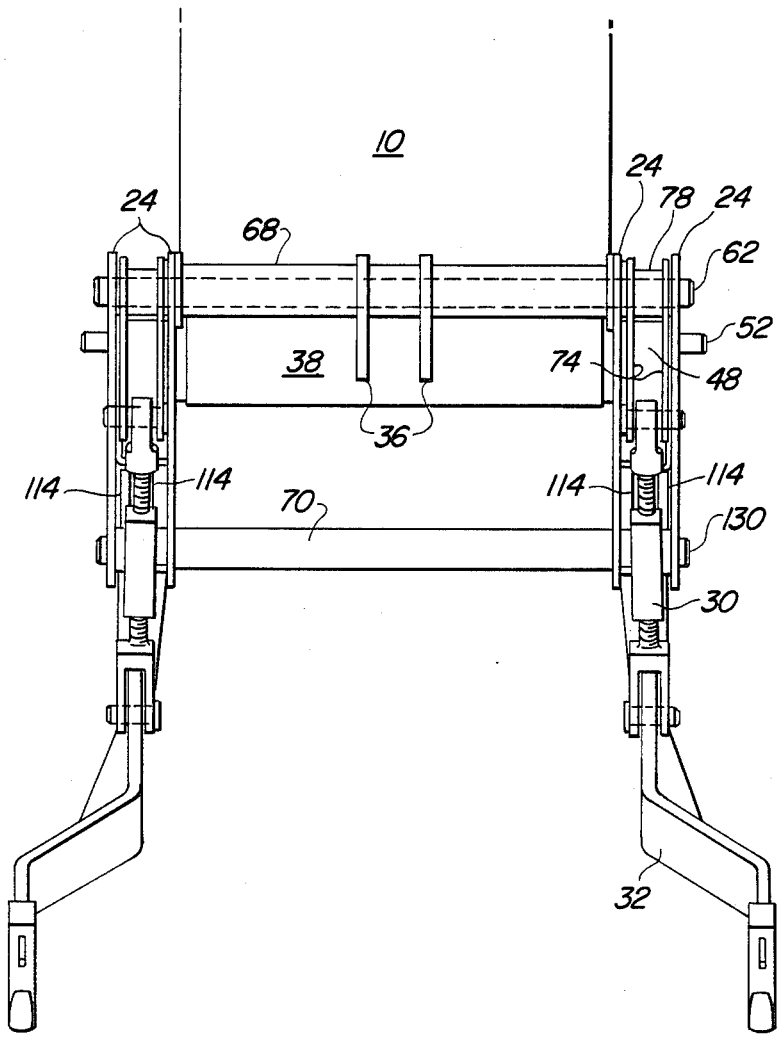
FIG. 2 shows a front view of the front part of the agricultural tractor with the power lift, according to the invention.

Each lift arm 26 comprises two angle levers 74 having two legs 76 which extend at an angle of about 105 degrees relative to each other and which are rigidly connected together by way of a respective sleeve 78 disposed at the point at which the two legs 76 meet, as best seen from FIG. 2. A respective bore (not shown) for accommodating the shaft 62 and mounting pins 80 and 82 is provided at the point at which the two legs 76 meet and also in the end regions thereof. The axis of the bore which is disposed at the point at which the legs 76 meet is at the same time the axis of the sleeves 78 so that they are in concentric relationship with each other. The sleeves 78 non-rotatably accommodate the shaft 62 therein so that the lift arms 26 are jointly pivotable vertically with the shaft 62 between the respectively associated plates 24. A plurality of bores may be provided for accommodating the shaft 62 in order to permit adjustment of the lift arm 26, so that the lift height and/or the lift range of the lower links 32 may be shifted or displaced, possibly with the arms 34. In this case, the tube 68 would also have to be correspondingly shifted or displaced.

Starting from an initial position of the lift arms 26, in which the bores at the outer ends of the legs 76 are at approximately the same spacing from the surface on which the tractor 12 is standing, the end of the lift arms 26, which is towards the tractor 12, are referred to as the rearward fork ends while the ends which are remote from the tractor 12 are referred to as the forward fork ends 86.

The rearward fork end 84 of the lift arm 26 carries, by way of the mounting pin 82, one end of a piston rod 92 which projects out of a cylinder housing 88 of a hydraulic cylinder 90 which is used as a lifting means. The cylinder housing 88 pivotally engages a mounting member 94 which is welded into position in the space 48 inside the frame 22. The piston rod 92 may extend as far as the lift arm 26 as the frame 22 is open in a forward direction between the plates 24. The hydraulic cylinder 90 is connected by way of lines (not shown) to a control valve (also not shown) so that pressure fluid can be fed to the hydraulic cylinder after suitable actuation by an operator, whereupon the piston rod 92 extends from or retracts into the cylinder housing 88. Extension of cylinder 90 pivots the lift arm 26 in a clockwise direction, viewing FIG. 1. Retraction of cylinder 90 pivots the lift arm in a counterclockwise direction. The opening of the frame 22 between the plates 24 is of such a size that when the piston rod 92 is completely retracted, the lift arm 26 still partially projects into the interior space 48 defined by the frame 22.

The forward fork end 86, by way of the mounting pin 80, vertically pivotably accommodates within itself the lift strut 30 which, in conventional manner, comprises upper and lower screw-threaded portions 96 and 98 and a screw-threaded sleeve 100 which positively accommodates the screw-threaded portions 96 and 98 therewithin. The threads on the upper and lower screw-threaded portions 96 and 98 are of opposite hands so that when the screw-threaded sleeve 100 is turned, the overall length of the lift strut 30 is either increased or reduced. The upper screw-threaded end portion 96 pivots about the mounting pin 80 on the front fork end 86. The lower screw-threaded portion 98 pivotably engages the lower link 32.

For that purpose, in its lower forked end region, the lower screw-threaded portion 98 has two bores (not shown) which are aligned with each other, while the lower link has a plurality of pivot mounting points in the form of bores 102 which can be selectively connected to the bores in the lower screw-threaded portion 98 by way of a pin 104.

The lower link 32 is in the form of a flat-bar steel link of rectangular cross-section, the longer lengths of the sides of which are in a vertical position. In its front region, the link 32 has a connecting member 106, for example, a catch hook or a ball coupling. Depending on the standardized connecting dimensions of the machines and implements which are to be mounted thereon, the lower link 32 is bent forwardly and outwardly to a greater or lesser degree, as indicated at 108, so that starting from the narrow width of the front-mounted power lift 20, or the spacing between the intermediate spaces between the left-hand and right-hand plates 24, the arrangemnet can arrive at the spacing between the pivot mounting points on the implement. Adjacent its upper edge and disposed rearwardly from the cranked portions 108, the lower link 32 has the bores or openings 102 of which, in the illustrated embodiment, three are arranged directly one behind the other and at the same spacing from each other. At a small spacing therefrom, there is a fourth bore 110, and then a fifth bore 112 at the rearward end of the lower link 32. One of the three front bores 102 can receive the pin 104 for connection to the lower screw-threaded portion 98 of the lift strut 30. The provision of a plurality of bores 102 permits the strut 30 to be joined to the lower link 32 at various positions to best accommodate the force which can be supplied by the hydraulic cylinder 90.

The arm 34 is formed by two spaced arm plates 114, each with seven mutually aligned bores. These bores may be divided into a first group related to the height of lift of the front-mounted power lift 20, and a second group related to the lifting range. The first group includes five bores, four of which, as indicated at 116, are disposed on a circular arc around the fifth bore 118. The radius of the circular arc corresponds to the spacing between bores 112 and 110 in the lower link 32. The bore 118 and the bore 110 always have pivot pin 120 passing therethrough which permits pivotal movement of the lower link 32 between the plates 114. Selectively, a holding element or pin 122 can additionally be passed through the bore 112 of the lower link 32 and through one of the bores 116 which are disposed in the arcuate array around the fifth bore 118 in the plates 114.

Figure 3:
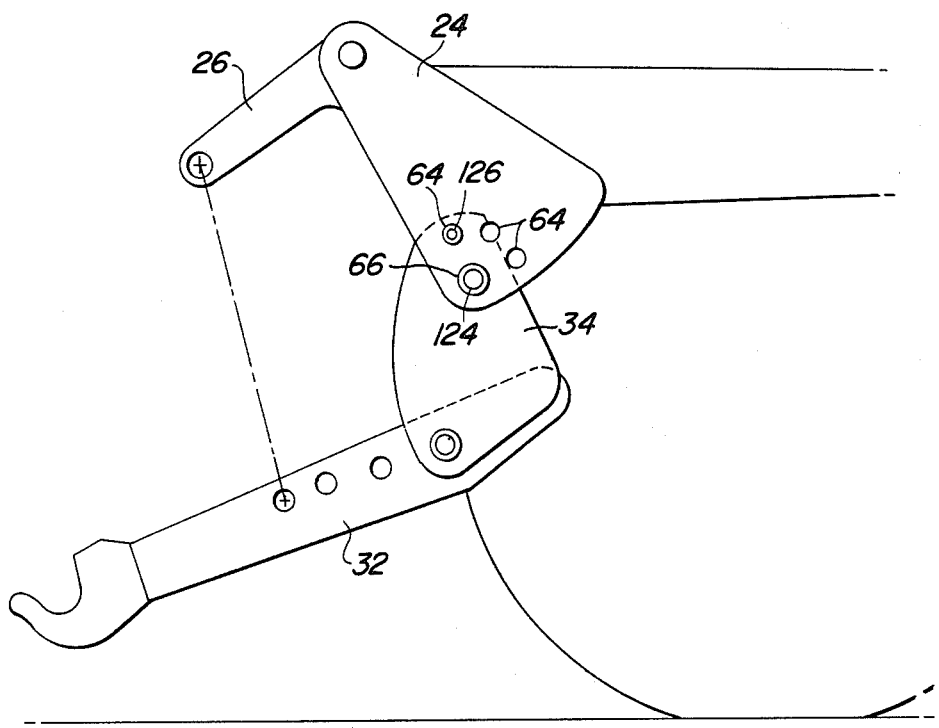
FIG. 3 shows the power lift in another operative position.

As best seen from FIG. 3, the second group of bores comprises a larger and a smaller bore, 124 and 126, respectively. A sleeve 128, which rigidly connects the two plates 114 together, is welded between the two plates 114 and in concentric relationship to the respective larger bores 124. The sleeve 128 pivotally receives a shaft 130 which extends between the outer plates 114 on the left-hand and right-hand sides of the front-mounted power lift 20. The shaft 130 and the shaft 62 which extends through the bores 60 in the upper corner region 54 of the plates 24 respectively extend in the tubes 68 and 70 which connect the inner plates 24 together. The two plates 114 on each side are thus jointly vertically pivotable between the plates 24 and about the shaft 130. The spacing between bores 126 and 124 is the same as the spacing between bore 64 and mounting 66, so that the smaller bore 126 of the second group can be aligned with one of the three bores 64 in the lower corner region of the plates 24, and the pin 122 can be passed either only through the smaller bore 126 in the second group and through one of the bores 64 in the plate 24 or through one of the bores 116 in the first group and through the fifth bore 112 in the lower link 32, as otherwise the lower link 32 no longer engages the plates 24 vertically pivotably, but rigidly.

Finally, the mounting member 36 for the upper link is welded or screwed in position on the transverse member 38 and on the tube 68 which connects the upper corner regions 54 of the inner plates 24, as best seen in FIG. 2.

MODE OF OPERATION

The significance of the individual parts of the front-mounted power lift and the mode of operation thereof can be described with reference to the foregoing description, in the following terms. The height of lower links 32 of the front-mounted power lift 20 is controlled by the hydraulic cylinders 90. When cylinders 90 are extended, the lift arms 26 are pivoted in the clockwise direction. The lift arms 26 are connected to lower links 32 by way of the lift struts 30 so that the lower links 32 also pivot in a clockwise direction either about the shaft 130 in the larger bore 124 or about the pin 120 in the bore 112. Lowering movement of the lower links 32 occurs in a similar fashion when the cylinders 90 are retracted.

Whether the pivotal movement takes place about the shaft 130 or about the pin 120 depends in which lifting range or at which lift height the lower links 32 are intended to move. In that respect, the term lifting range is intended to mean the area in front of the tractor 12 over which the lower links 32 pass, possibly with the arms 34. Thus, in the illustrated embodiment, there are seven different possible modes of connection of the lower link 32 to the plates 24. In that connection, the lift height can be shifted four times and the lifting range can be shifted three times.

The lift height is controlled by one of the four bores 116. It is worth noting that the length of the lift struts does not have to be altered to achieve a higher initial lift height.

The lifting range is dependent on the combination of the smaller bore 126 of the first group and one of the three bores 64 in the lower corner region 56 of the plates 24 (see in that connection FIG. 3). The lifting range of the lower links 32 is shifted towards the tractor 12 by aligning smaller bore 126 with a forwardly positioned bore 64 in the lower corner region. The lifting range is shifted forwardly and away from the tractor 12 by aligning smaller bore 126 with a rearwardly positioned bore 64 in the lower corner region 56.

The provision of the three bores 102 in the lower link 32 means that the strut 30 can be changed over in each case in such a way that the spacing between the front fork end 86 of the lift arm 26 and the respective bore 102 in the lower link 32 remains approximately the same.

If the front-mounted power lift 20 is not to be connected to an implement, but is itself to remain on the tractor 12, then the lift strut is easily separated from the lift arm 26, and the lower link 32 is pivoted upwardly and secured with the lift strut 30 to the holding pin 50 which holds the frame 22 to the main frame structure 18 of the tractor 12, more particularly the shank portion 52 of the pin 50. The lower links 32 then no longer project forwardly beyond the tractor 12, which could cause danger to traffic. Instead, they extend close to and at least in substantially parallel relationship with the front part 10 of the tractor 12, thereby complying with the relevant safety requirement.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

It will be appreciated that the number and the specific arrangement of all the above-indicated bores 60, 64, 66, 102, 110, 112, 116 and 118 is only given by way of example so that in a different situation of use, the number thereof may also be increased or reduced and the arrangement thereof may be varied.

Other situations of use may be, for example, a loading platform on a loading ramp, a connecting linkage of a space vehicle, a connecting linkage for a loader with the loading equipment or a three-point appliance coupling arrangement at the rearward end of a vehicle which can be used for agricultural purposes.

I claim:

1. A front-mounted power lift assembly for an agricultural tractor comprising a frame member fixed to the tractor, at least one vertically movable lower link having means for engaging an implement, and at least one arm, one end of the arm being coupled to the lower link, characterized by means for pivotally coupling the link to the one end of the arm at a pivot axis and by means for selectively rotatably and non-rotatably connecting the other end of the arm to the frame member, the means for connecting the arm to the frame member comprising at least one opening in the arm, a plurality of openings in the frame member and a pin for insertion through the at least one opening in the arm and through a selected one of the frame member openings, the power lift assembly further comprising a lifting means for vertical moving of the lower link.

2. The power lift assembly of claim 1, characterized by means for securing the lower link to the arm in a plurality of positions, the securing means comprising a plurality of openings in the arm spaced apart on a radius around the pivot axis, an opening in the lower link, and a holding element for insertion through the lower link opening and through a selected one of thearm openings.

3. The power lift assembly of claim 2, wherein the lower link includes a plurality of pivot mounting points for connection with the lifting means, each of which points are at a respective different distance from the pivot axis of the lower link.

4. The power lift assembly of claim 1, wherein the lifting means comprises a hydraulic cylinder and wherein the power lift assembly comprises hollow shaped members which receive therein the hydraulic cylinder.

5. The power lift of claim 1 wherein:
an angle lever is pivotally supported by the frame member, the angle lever interconnecting the lifting means and the lower link.

6. The power lift assembly of claim 5, further comprising means for fixing the angle lever in various positions relative to the plate.

* * * * *